US00RE44044E

(19) United States
(12) Reissued Patent
Vidal et al.

(10) Patent Number: US RE44,044 E
(45) Date of Reissued Patent: Mar. 5, 2013

(54) HIGH CAPACITY COMPACT DISK PLAYER

(75) Inventors: Joel Vidal, Tenafly, NJ (US); Ari Krashin, Rockville, MD (US)

(73) Assignee: TechSearch, LLC, Newport Beach, CA (US)

(21) Appl. No.: 10/996,329

(22) Filed: Nov. 24, 2004

Related U.S. Patent Documents

Reissue of:
(64) Patent No.: 6,215,754
Issued: Apr. 10, 2001
Appl. No.: 09/000,743
Filed: Dec. 30, 1997

U.S. Applications:
(63) Continuation of application No. 10/409,700, filed on Apr. 9, 2003.

(51) Int. Cl.
*G09B 20/001* (2006.01)
*G09B 20/014* (2006.01)
*G09B 27/012* (2006.01)

(52) U.S. Cl. ..... 369/84; 369/124.06

(58) Field of Classification Search ..... 369/84, 369/83, 85, 124.06, 47.12, 47.13, 59.24, 369/59.25, 47.19, 47.32, 53.31; 704/503
See application file for complete search history.

(56) References Cited

U.S. PATENT DOCUMENTS 5,331,617 A 7/1994 Fuma et al.
5,345,433 A 9/1994 Ohga et al.
5,442,309 A * 8/1995 Cabler ..... 327/108
5,457,667 A 10/1995 Kojima et al.
5,463,607 A 10/1995 Roth et al.
5,579,183 A 11/1996 Van Gestel et al.
5,592,450 A 1/1997 Yonemitsu et al.
5,596,565 A 1/1997 Yonemitsu et al.
5,671,204 A * 9/1997 Yokouchi et al. ..... 369/47.33
5,734,787 A * 3/1998 Yonemitsu et al. ..... 386/111
5,832,445 A * 11/1998 Gao et al. ..... 704/200.1
5,864,817 A 1/1999 Galbi
5,889,747 A 3/1999 Hisamatsu et al.
5,898,119 A 4/1999 Tseng et al.
5,914,941 A 6/1999 Janky
5,926,448 A 7/1999 Yokota et al.
5,926,606 A * 7/1999 Wang ..... 386/204
5,959,944 A * 9/1999 Dockes et al. ..... 369/84
5,980,262 A 11/1999 Tseng et al.
6,081,651 A * 6/2000 Kim ..... 386/329
6,115,337 A * 9/2000 Takagi et al. ..... 369/47.33

(Continued)

FOREIGN PATENT DOCUMENTS

EP 0512821 B1 11/1992
EP 0 691 652 A1 7/1995

(Continued)

OTHER PUBLICATIONS

"A Compiled Digital Signal Processor for Music", by Rossum, published by Cahners Exposition Group—1985.

(Continued)

*Primary Examiner* — Nabil Hindi
(74) *Attorney, Agent, or Firm* — Martin & Ferraro, LLP

(57) ABSTRACT

A CD player, including a CD drive, which receives a CD and reads compressed digital audio data recorded thereon, and an integrated circuit chip, which decompresses the compressed data and produces a non-compressed audio output. Preferably, the data are compressed by MPEG compression, most preferably by MPEG Layer-3 compression, so that the data are compressed approximately 12-fold, and the CD contains over 800 minutes of high-quality stereo sound recording.

13 Claims, 2 Drawing Sheets

U.S. PATENT DOCUMENTS

| | | | | |
|---|---|---|---|---|
| 6,169,847 | B1 * | 1/2001 | Mizoguchi et al. | 386/329 |
| 6,215,754 | B1 | 4/2001 | Vidal et al. | |

FOREIGN PATENT DOCUMENTS

| | | | |
|---|---|---|---|
| EP | 0 673 034 | A2 | 9/1995 |
| EP | 0512821 | B1 | 4/1997 |
| EP | 0772192 | A2 | 5/1997 |
| EP | 0786774 | A2 | 7/1997 |
| EP | 0 967 613 | A1 | 12/1999 |
| JP | 7-272402 | | 10/1995 |
| JP | 8096487 | | 4/1996 |
| JP | 8-146995 | | 6/1996 |
| JP | 8263086 | | 10/1996 |
| JP | 8272860 | | 10/1996 |
| JP | 9185868 | | 7/1997 |
| KR | 1997-63195 | | 9/1997 |

OTHER PUBLICATIONS

"A MPEG Decoder ASIC for Compact Disc Interactive", by Schepens, published by IEEE Computer Society Press—1992.
"A New Generation of MPEG-2 Video Encoder ASIC & Its Application to New Technology Markets", by Irvin et al., published by IEEE, 1996.
"A Single-chip MPEG/Audio Decoder LSI Based on a Compact Decoding Algorithm", by Idaware et al., published by IEEE VLSI Signal Processing VIII—1995.
"A Single-chip MPEG1 Audio/Video Decoder Using Macrocore and Cell-base Implementation", by Katayama et al., published by IEEE VLSI Signal Processing, VIII—1995.
"An ASIC Implementation of the MPEG-2 Audio Decoder", by Han et al., published by IEEE Transactions on Consumer Electronics, vol. 42, No. 3, Aug. 1996.
"An MPEG Audio Decoder Chip", by Tsai et al., published by IEEE Transactions on Consumer Electronics, vol. 41, No. 1, Feb. 1995.
"ATRAC:Adaptive Transform Acoustic Coding For MiniDisc", by Tsutsui et al., 1992.
"Audio Compression for Network Transmission", by Dietz et al., published by J. Audio Eng. Soc., vol. 44, No. 1/2 1996.
"Certification", undated (attached as Exhibit 12).
"Digital Audio Compression: Why, What, and How", by Bier—2000.
"Dolby AC-3 and MPEG-2 Audio Decoder IC With 6-Channels Output", by Bergher et al., published by IEEE Transactions on Consumer Electronics, vol. 43, No. 3, Aug. 1997.
"Embeddable CMOS 3.3V 16 Bits Monobit and Multibit Delta-Sigma Digital to Analog Converter", by Comminges, published by Proceedings of the IEEE 1995 International Conference on Consumer Electronics.
"http://www.cdpage.com/Compact__Disc__Glossary/glossarym.html", which has an article entitled Glossary of CD and DVD Technologies—1998.
"http://www.cdrfaq.org/faq01.html", which has an article entitled Andy McFadden's CD-Recordable FAQ—Section 1—2001.
"http://www.cdrfaq.org/faq02.html", which has an article entitled Andy McFadden's CD-Recordable FAQ—Section 2—2001.
"http://www.cdrfaq.org/faq03.html", which has an article entitled Andy McFadden's CD-Recordable FAQ—Section 3—2001.
"http://www.cybertheater.com/News__Views/Wces96/wces96.html", which contains an article titled The 1996 Winter Consumer Electronics Show by Millick et al.
"http://www.cybertheater.com/News__Views/Wces97/wces97.html", which contains an article titled The 1997 Winter Consumer Electronics Show by Cruce.
"http://www.del.denon.com/info/history.asp", which has an article entitled Denon's Hostory of Excellence.
"http://www.egrabow.com/archive.sonyh.htm", which contains tables titled Sony Home Audio Archive.
"http://www.etedeschi.ndirect.co.uk/museum/concise.history.htm", which contains an article titled A Concise History of Electronics.
"http://www.gi.alaska.edu/crd/cdrom/cdrom.html", which contains an article titled Compact Disc Creation Services CD-ROM Information.
"http://www.howstuffworks.com/cd.htm?printable=1", which contains an article titled How CDs Work by Brain.
"http://www.howstuffworks.com/dvd.htm?printable=1", which contains an article titled How DVDs and DVD Players Work by Nice.
"http://www.iis.fhg.de/amm/gallery/index.html", which contains reference to MPEG Layer-3 files.
"http://www.iis.fhg.de/amm/techinf/basics.html", which has an article entitled Basics about MPEG Perceptual Audio Coding—2001.
"http://www.iis.fhg.de/amm/techinf/faq.html", which contains an article titled Frequently Asked Questions with references to MPEG.
"http://www.iis.fhg.de/amm/techinf/layer3/index.html", which has an article entitled MPEP Audio Layer-3—2001.
"http://www.minidisc.org/MaskingPaper.html", which has an article entitled Masking and Perceptual Coding.
"http://www.mp3-mac.com/Pages/History__of__MP3.html", which has an artcle entitled The History of MP3 and how did it all begin?.
"http://www.mpeg.telecomitalialab.com/about__mpeg.htm", which contains an article titled MPEG Life.
"http://www.news.philips.com/archief/199704042.html", which contains a press release titled Philips announces versatile MPEG codec for PC applications, Apr. 4, 1997.
"http://www.news.philips.com/archief/199705010.html", which contains a press release titled Philips premieres DVD player in United States; announces joint DVD rental program with PolyGram, May 1, 1997.
"http://www.oneoffcd.com/info/historycd.cfm", which contains an article titled History of CD Technology.
"http://www.pcguide.com/ref/cd/formatCDDA-c.html", which contains a reference to Compact Disk Digital Audio (CD-DA) format.
"http://www.searchstorage.techtarget.com/sDefinition/0,,sid5__gci503642,00.html", which contains a reference to a compact disc "Red Book".
"http://www.semiconductors.philips.com/news/content/file__138html", which contains a press release titled Philips Semiconductors demonstrates a total solution to MPEG-2 signal processing at Comdex '96.
"http://www.semiconductors.philips.com/news/content/file__223.html", which contains a press release titled Philips Semiconductors launches new family of MPEG2 decoders, Aug. 13, 1997.
"http://www.sims.berkeley.edu/courses/is224/s99/GroupG/reportl.html", which contains references to MPEG.
"http://www.sony.co.jp.en.Fun.SH/1-20/h5.html", which has an article entitled A Great Invention 100 Years On.
"http://www.sony.co.jp/en/Fun/SH/1-20/h1.html", which has an article entitled Chasing and Being Chased.
"http://www.sony.co.jp/en/Fun/SH/1-20/h3.html", which has an article entitled X Day in Oct. 1982.
"http://www.sony.co.jp/en/Fun/SH/1-201/h1.html", which has an article entitled From a Small Piece of Wood.
"http://www.TEKTRONIX.COM/Measurement/App__Notes/mpegfund/", which contains a table of contents referring to the title A Guide to MPEG Fundamentals and Protocol Analysis.
"http://www.telecomitalialab.com/faq/mp1-aud/mp1-aud.htm", which has an article entitled MPEG Audio FAQ Version 9 MPEG-1 and MPEG-2 BC—Oct. 1998.
"http://www.validationstation.com/glossaryf.htm"—2001.
"http://www.whatis.techtarget.com/definition/0,,sid9__gci211759,00.html", which contains a reference to CD-ROM.
"Improved MPEG-2 Audio Multi-Channel Encoding", by Grill et al., published by Audio Engineering Society—1994.
"ISDN and ISO/MPEG Layer III Audio Coding: Powerful New Tools For Broadcast Audio Production", by Church.
"ISO/IEC MPEG-2 Advanced Audio Coding", by Bosi et al.
"Layer-III A Flexible Coding Standard", by Eberlein et al.
"More than Twelve Hours of Music on a Single CD", dated Nov. 25, 1994, apparent translation of German-language publication submitted as Exhibit 4 above (attached as Exhibit 9).
"MP3 and AAC Explained", by Brandenburg, published by AES 17th Interational Conference on High Quality Audio Coding.
"MPEG Audio Decoder for Consumer Applications", by Bergher et al., published by Proceedings of the IEEE 1995 Custom Integrated Circuits Conference—1995.

"MPEG Layer 3 Decoder on one Chip", undated, apparent translation of German-language publication submitted as Exhibit 6 above (attached as Exhibit 11).
"Notes" (attached as Exhibit 7).
"Overview of MPEG Audio: Current and Future Standards for Low-Bit-Rate Audio Coding", by Bradenburg et al., published by J. Audio Eng. Soc., vol. 45, No. 1/2 1997.
"Press News Layer 3 Single-Chip-Solution" by Intermetall.
"Proof Cover Sheet" (attached as Exhibit 6).
"Real-Time MPEG-1 Audio Coding and Decoding on a DSP Chip", by Murphy et al., published by IEEE Transactions on Consumer Electronics, vol. 43, No. 1, Feb. 1997.
"Second Generation ISO/MPEG-Audio Layer III Coding", by Herre et al.
"Short Information MAS 3503 C" by ITT Semiconductors.
"Single Chip MPEG Audio Decoder", by Maturi, published by IEEE Transactions on Consumer Electronics, vol. 38, No. 3, Aug. 1992.
"The CD Family—An overview of the existing CD formats and their interrelations", by Van Dijk et al., published by Philips Consumer Electronics B.V., Mar. 1996.
"The Chip for the Twelve-Hour Program", undated, apparent translation of German-language publication submitted as Exhibit 5 above (attached as Exhibit 10).
"The WorldStar Sound Format", by Buchta et al.
"VLSI Design and System Level Verification for the Mini-Disc", by Fujimoto et al., published by Proceedings of the 33rd Design Automation Conference—1996.
A letter in Korean and English that contains reference to a "Sinlge-chip solution for audio data decompression with MPEG Layer 3 method".
A paper titled "A Guide to MPEG Fundamentals and Protocol Analysis (Including DVB and ATSC)", Tektronix, Inc.—2000.
A product brochure "STA016T MPEG 2.5 Layer III Audio Decoder Supporting CD-ROM Capability & ADPCM," ST Microelectronics—Jun. 2001.
A selected page of an unknown document in German containing an article "ITT intermall MPEG 3 auf einem Chip".
Apparent English-Language translation of unidentified document submited as Exhibit 2 above (attached as Exhibit 8).
Apparent publication in German, entitled "MPEG-Layer-3-Decoder auf einem Chip", undated but with the hand-written notation (as furnished by counsel for Robert Bosch Corporation) "4.10.94" attached as Exhibit 5).
English-language translation "MPEG 3 auf einem chip" (attached as Exhibit B).
Forwarded e-mail of original message dated Sep. 5, 2002, from Ulrich Sieben (attached as Exhibit 1).
Frequently Asked Questions about MPEG Audio Layer-3, Version 2.83, Oct. 1997, http://www.iis.fhg.de/departs/amm/layer3/sw/index.html.
German Language Memo Dated Sep. 1995 (provided as Exhibit 2 in the IDS filed Oct. 3, 2002) and corresponding English Translation (Provided as Exhibit 8 titled "ML3 3503 project at Intermetall has been successfully completed.").
http://www.hitsquad.com/smm/edit/10000020.html.
http://www.hitsquad.com/smm/programs/MPEG3/.
http://www.hitsquad.com/smm/programs/MPEG3/download.shtml.
http://www.hyperreal.org/intersection/tools/msdos/sound/mpeg/mpeg3.zip.
http://www.rasip.fer.hr/cgi-bin/AT-rasipsearch.cgi.
http://www.rasip.fer.hr/research/compress/algorithms/tools/index_hr.html.
http://www.rasip.fer.hr/research/compress/algorithms/tools/util.htm.
http://www.rasip.fer.hr/research/compress/alrorithms/tools/dos.htm.
http://www.rasip.fer.hr/resource/index.html.
http://www.rasip.fer.hr/search.html.
http://www.rasop.fer.hr/.
http://www.sony.co.jp/en/Fun/capsule/index2.html.
Letter dated Nov. 11, 2002, from Derek C. Steffner, Michael, Best & Friederich LLP, counsel for Robert Bosch Corp. In Civil Action No. 01 C 9150, *TechSearch LLC* v. *Robert Bosch Corp. et al.,* in the United States District Court for the Northern Disrtrict of Illinois, Eastern Division.
Letter dated Sep. 12, 2002, from Derek C. Steffner, Michael Best & Friederich LLP, counsel for Robert Bosch Corp. in the above-referenced litigation (attached as Exhibit A).
MP3 standard "ISO/IEC 11172-3".
Photocopy of apparent publication in German, entitled "Der Chips fürs Zwöfstunden-Programm", undated but with the hand-written notation (as furnished by counsel for Robert Bosch Corporation) "15.11.94" (attached as Exhibit 4).
Photocopy of apparent publication in German, entitled "Mehr als zwölf Stunden Musik auf einer einzigen CD", dated Nov. 25, 1994 (attached as Exhibit 3).
Selected pages from Stereophile magazine, Apr. 1995.
Selected pages of "Programming Embedded Systems in C and C++", by Barr, published by O'Reilly & Associates, Inc., 1999.
Selected pages of "The Computer Desktop Encyclopedia", Second Edition, by Freedman.
Selected pages of a document titled "MPEG Layer 2/3 Audio Decoder".
Selected pages of an unknown article bearing page labels BOS 001497-1511.
Selected pages titled "Compact Disc" and "Compact Disc Player" by Riaz, "How Products are Made", published by Gale Research Inc.
Unidentified document, apparently in German and dated Sep. 2, 1995 (attached as Exhibit 2).
Witte et al., Single Chip Implementation of an ISO/MPEG Layer III Decoder. Document presented at 96th Convention of Audio Engineering Society; Feb. 26, 1994.

* cited by examiner

HIGH CAPACITY COMPACT DISK PLAYER

Matter enclosed in heavy brackets [ ] appears in the original patent but forms no part of this reissue specification; matter printed in italics indicates the additions made by reissue.

FIELD OF THE INVENTION

*Notice: more than one reissue application has been filed for the reissue of U.S. Pat. No. 6,215,754. The present reissue application is a continuation of reissue application Ser. No. 10/409,700, filed Apr. 9, 2003, which is a reissue application of U.S. Pat. No. 6,215,754.*

The present invention relates generally to the field of audio recording and playing, and specifically to audio compact disks players.

BACKGROUND OF THE INVENTION

Compact disks (CDs) an storage devices for audio signals encoded as digital data. Audio CD players convert the CD digital data to analog data, which are directly reproducible as audio signals.

Conventional CDs contain digitized audio data, generally without any data reduction or compression. They are typically capable of storing 650 megabytes of data, which is roughly equivalent to 74 minutes of high-quality standard audio transmission. The conventional audio CD is relatively impervious to normal usage, user-friendly, inexpensive to manufacture, and produces high-quality sound.

The Moving Picture Experts Group (MPEG) has defined encoding standards for moving pictures and audio signals. MPEG encoding compresses signals using encoding algorithms that produce a slightly less than exact reproduction of the picture, or audio signal, but in a way that is normally largely unnoticeable to the human senses. The MPEG standards for encoding audio signals are known as MPEG Audio Layers-1, -2 and -3, with each layer being progressively more compressed than that before it. Layer-1 compresses digital audio data approximately 4-fold; Layer-2, 6- to 8-fold, and Layer-3, 10- to 12-fold. Whereas uncompressed analog-to-digital encoding requires nearly 10 megabytes of data for 1 minute of high-quality stereo sound, with MPEG Layer-3 encoding, the same 1 minute of high-quality stereo sound requires less than 1 megabyte of data.

MPEG encoding is used for visual and video encoding, for example, in DVDs (Digital Video Disks), which are viewable on MPEG-enabled DVD video players Fraunhofer Gesellschaft IIS-A, of Erlangen, Germany, offers MPEG-encoded audio/visual CD-ROMs designed for use with a personal computer having a sufficiently powerful CPU and suitable decoding software. MPEG Layer-3 audio encoding is also available for use in computers, network-based radio, and other applications that require large audio signal data bases.

To date MPEG compression and decompression require the use of a computer. For online, real-time play, particularly of MPEG Layer-3, which is relatively computation-intensive, a powerful computer, based at least on an Intel Pentium MMX processor, for example, is generally needed. Consequently, MPEG audio compression has not been applied to home entertainment or portable audio devices.

European Patent Application EP 0786774 describes a digital portable stereo headphone player for recording and playback of compressed audio data on a mini-disk. The player includes a compression/expansion circuit, but no details of this circuit are described. The player is complex and appears to have many of the features of a personal computer system.

European Patent Application EP 0772192 describes optical disk playback apparatus, which is capable of receiving disks that include either compressed or non-compressed audio data. If a disk including compressed data is received, the apparatus converts the data to non-compressed data.

SUMMARY OF THE INVENTION

It is an object of some aspects of the present invention to provide a personal audio device that can play audio CDs having extended playing time, preferably it least 800 minutes of playing time.

It is a further object of some aspects of the present invention to provide a system for producing extended-play audio CDs for home and mobile use, preferably using standard-size (12 cm diameter), widely available CD media.

In some preferred embodiments of the present invention, a CD player includes an integrated circuit chip, referred to herein as an MPEG decoder chip, or as an MPEG decompression chip, to decode compressed, MPEG-encoded audio data and read it as digital audio signals. The player receives long-play CDs including digital audio data that have been compressed according to the MPEG standard. The compressed data are read from the CD and passed to the chip, which decodes the data and outputs a stream of standard, uncompressed CD audio data, thereby enabling real-time, on-demand use of MPEG-encoded audio CDs without the necessity of a large and costly computing circuitry.

Preferably, the encoded audio data are compressed at least 4-fold, more preferably at least 8-fold, using MPEG Layer-1 or Layer-2 encoding, respectively. Most preferably, the data are compressed approximately 12-fold, based on the level of compression that is typically achieved using MPEG Layer-3 audio compression. The audio player is thus capable of receiving and playing long-play CDs including 12 times the conventional 74 minutes, or approximately 888 minutes (14.8 hours) of high-quality stereo music or voice recording.

Preferably, the MPEG decoder chip comprises a custom or application-specific integrated circuit, which is fabricated with firmware capability to decompress MPEG Layer-3 encoded audio data in real time. MPEG decoding algorithms are known in the art, but are typically implemented in software using general-purpose computer processors. The CD player of the present invention may include such a general-purpose processor, but those skilled in the art of integrated circuits will appreciate that a custom integrated circuit may be designed and fabricated to implement the MPEG decoding more efficiently and at a lower production cost than the general-purpose processor.

In one preferred embodiment of the present invention, the CD player is used as a component of a home entertainment system. In other preferred embodiments, the MPEG decoder chip is installed in a mobile CD player, for example, a personal portable CD or an automobile CD player. The present invention is particularly advantageous in these mobile applications, since it relieves the user of the need to carry around a large number of short-play (74 minute) CDs. Replacing multiple short-play CDs with one or a few long-play CDs, will also save on storage space in the home, office or vehicle. The CD player, be it the mobile or home entertainment version, is preferably equipped with all the common features and functions of a standard CD player, such as play, stop, pause, forward, rewind, display of track numbers, display of elapsed playing time, etc.

In other preferred embodiments of the present invention, a CD recording system comprises two CD drives: a read drive and a write drive. The read drive receives and reads conventional, non-compressed audio CDs. Data read by the read drive (either entire CDs or specific track(s) as selected by the user) are compressed, preferably using MPEG audio encoding, most preferably MPEG Layer-3. The compressed data are then written onto a recordable CD in the write drive, thus enabling 888 minutes (14.8 hours) of high-quality stereo sound to be recorded on a conventional CD, which normally would hold only 74 minutes of sound. The compression is preferably performed by an MPEG Layer-3 encoder chip, similar in principle to the decoder chip described above.

By using MPEG Layer-3 encoding, the system can condense the entire contents of as many as 12 conventional fully-recorded CDs onto a single, long-playing CD. (In fact, since commercially-recorded CDs are usually not recorded to their full 74 minute capacity, but rather to about 80% capacity, it may be possible to condense up to 15 conventional CDs onto a single long-playing CD.) A user of the recording system can record audio segments from the conventional CDs onto the long-playing CD in any desired sequence and combination. The long-playing CD produced in this manner is particularly suited for use in the CD player described above, but can also be used in a computer CD drive, for example, using software decompression and an appropriate computer sound-card and speakers to play back the recorded audio.

Alternatively, the CD recording system may comprise only a single read/write CD drive, along with a fixed mass-memory device, such as a magnetic hard disk. In this case, the conventional CDs, on which non-compressed audio data are recorded, are first inserted one by one into the drive. The audio data are read from the CDs, compressed, preferably using MPEG audio compression, most preferably MPEG Layer-3 encoding, then temporarily stored in the mass-memory device. Then the recordable CD is inserted into the same read/write CD drive, and the stored, compressed data from the mass-memory device are recorded on the CD.

While preferred embodiments of the present invention are based on MPEG audio compression, and particularly MPEG Layer-3 compression, it will be appreciated that the principles of the present invention may also be applied to produce audio players and recording systems based on other compression schemes, including MPEG audio Layer-4 encoding currently under development.

There is therefore provided, in accordance with a preferred embodiment of the present invention, a CD player, including:

a CD drive, which receives a CD and reads compressed digital audio data recorded thereon; and an integrated circuit chip, which decompresses the compressed data and produces a non-compressed audio output.

Preferably, the data are compressed by MPEG compression, and more preferably, by MPEG Layer-3 compression.

Preferably, the data are compressed at least 4-fold, more preferably at least 8-fold, and most preferably approximately 12-fold.

Preferably, the chip includes firmware for decompressing the data.

Preferably, the chip includes a custom integrated circuit chip and does not include a general purpose processor.

Preferably, the CD player includes a mobile personal audio player, which is preferably installed in a vehicle.

There is further provided, in accordance with a preferred embodiment of the present invention, a CD recording system, including:

a read drive, which receives and reads a first CD having audio data recorded thereon;

compression circuitry, which receives and compresses the audio data from the read drive; and a write drive, which receives the compressed data and records the compressed data on a second, recordable CD.

Preferably, the circuitry compresses the data by MPEG compression, and more preferably, by MPEG Layer-3 compression. Preferably the circuitry includes firmware for compressing the data.

Preferably the circuitry compresses the data at least 4-fold, more preferably at least 8-fold, and most preferably approximately 12-fold.

There is further provided, in accordance with a preferred embodiment of the present invention, a method for playing a long-playing audio CD, including:

reading compressed digital audio data from the CD; and decompressing the data using a custom integrated circuit chip; and converting the decompressed data to analog form.

Preferably, decompressing the data includes decompressing by MPEG decoding, and more preferably by MPEG Layer-3 decoding.

Preferably, decompressing the data includes decompressing by at least 4-fold, more preferably by at least 8-fold, and most preferably by approximately 12-fold.

Preferably reading the compressed data includes playing the CD in a mobile personal audio player, preferably in a CD player installed in a vehicle.

There is further provided, in accordance with a preferred embodiment of the present invention, a method for producing a long-playing audio CD, including:

reading digital audio data from a prerecorded CD;

compressing the data using MPEG compression; and recording the compressed data on the long-playing CD.

Preferably compressing the data includes compressing by MPEG Layer-3 compression.

Preferably compressing the data includes compressing by at least 4-fold, more preferably, by at least 8-fold, and most preferably, by approximately 12-fold.

Preferably, reading the data includes reading data from a plurality of prerecorded CDs.

Furthermore, reading the data preferably includes inserting each of the plurality of CDs in sequence into a read drive, in order to read data therefrom.

Preferably, recording the data includes recording data on the long-playing CD in an order that is different from the order of the data on the prerecorded CD.

BRIEF DESCRIPTION OF THE DRAWINGS

The present invention will be more fully understood from the following detailed description of the preferred embodiments thereof, taken together with the drawings in which.

DETAILED DESCRIPTION OF PREFERRED EMBODIMENTS

Figure 1A:
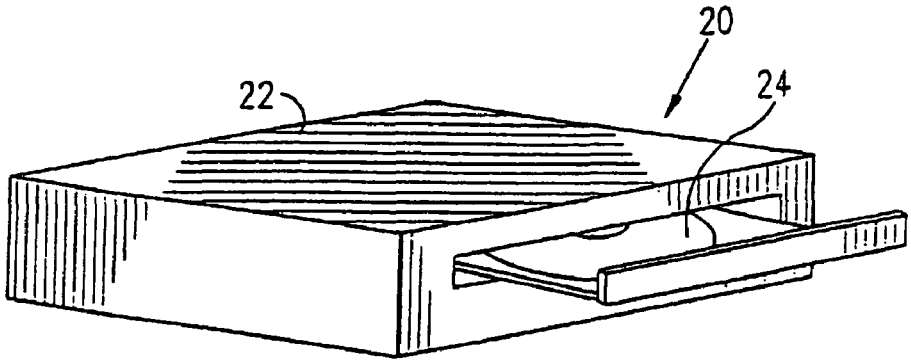
FIG. 1A is a simplified pictorial illustration of a CD drive, in accordance with a preferred embodiment of the present invention.
Figure 1B:
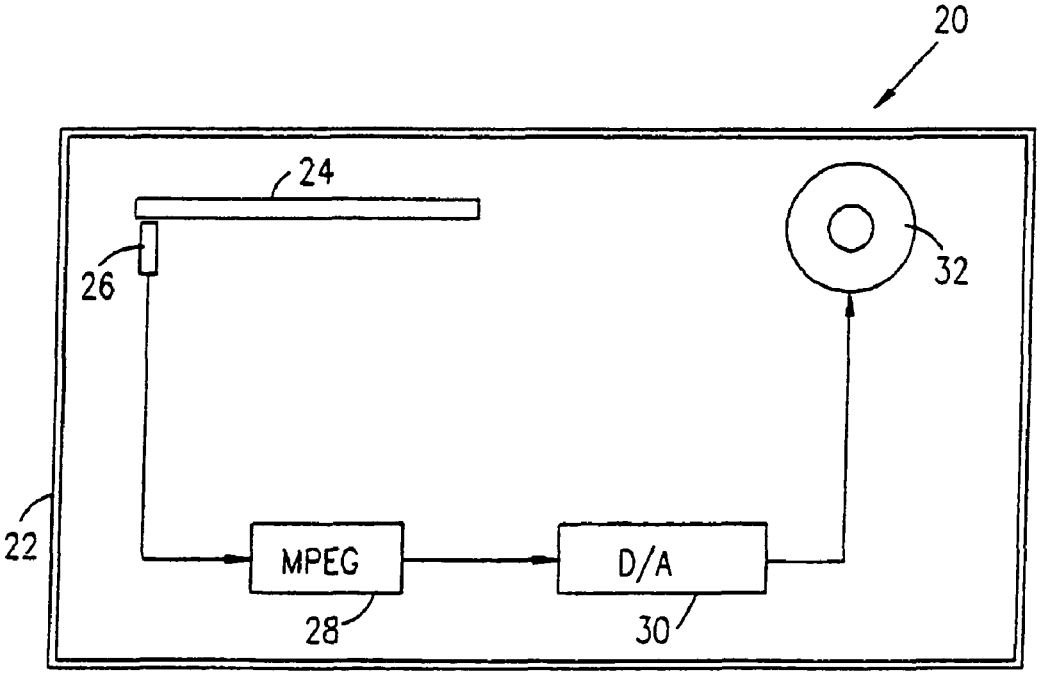
FIG. 1B is a schematic block diagram illustrating the operation of the drive of FIG. 1A.

Reference is now made to FIGS. 1A and 1B, which schematically illustrate a CD player 20, in accordance with a preferred embodiment of the present invention. FIG. 1A is simplified pictorial illustration, and FIG. 1B is a schematic block diagram of the CD player.

A long-playing CD 24, on which compressed digital audio signals are encoded, preferably using MPEG Layer-3 compression, is inserted into a CD drive 22 in MPEG-enabled CD player 20. An optical read head 26 reads the compressed data on CD 24, and transfers the data to an MPEG decoder chip 28. Chip 28 reads the data, and via algorithms known in the art, decodes the compressed MPEG digital data. The uncompressed data is then transferred from chip 28 to a D/A converter 30. Converter 30 converts the digital data to analog data, as is known in the art, and passes the analog data, which are directly reproducible as audio signals, to speaker 32 or to another output device or output socket (such as headphones or amplifier—not shown).

It is noted that the scan pattern and/or scan speed to read head 26 over the surface of CD 24 may be adjusted to accommodate the high density of information on the CD. Also, buffer memories may be introduced between read head 26 and chip 28 and/or between chip 28 and D/A converter 30, in order to ensure a smooth, properly times stream of audio data from CD 24 to speaker 32.

CD player 20 may be located either in a home audio entertainment center, a portable CD player, a car CD player or any other form of personal CD player, thus enabling a user to hear up to 888 minutes of high-quality stereo listening entertainment from a conventionally sized CD instead of the conventional 74 minutes. Additionally, CD player 20 may also be equipped to play conventional short-play CDs if desired. For this purpose, chip 28 is preferably capable of identifying whether the data read by head 26 is encoded or not; if not, no decoding will take place, and direct digital-to-analog playback will occur.

Chip 28 is preferably a custom VLSI chip, incorporating a suitable processor and firmware, stored on the chip, for decoding compressed MPEG digital audio data, including Layer-3 encoded data. Methods of real-time decoding MPEG Layer-3 digital audio data are known in the art. For example, a suitable MPEG decoding software program, known as AMP (Audio MPEG Player), version 0.75, which runs on a Pentium-type processor in a personal computer, is incorporated hereinbelow as Appendix A. It is within the capabilities of semiconductor manufacturers to design and produce chip 28 so as to implement the program listed in Appendex A or another, similar program. It will be understood, however, that the functions of chip 28 in CD player 20 could also be performed using one or more chips of other types, for example, one or more ASIC chips and/or a general-purpose processor together with requisite peripheral and/or memory components.

Figure 2A:
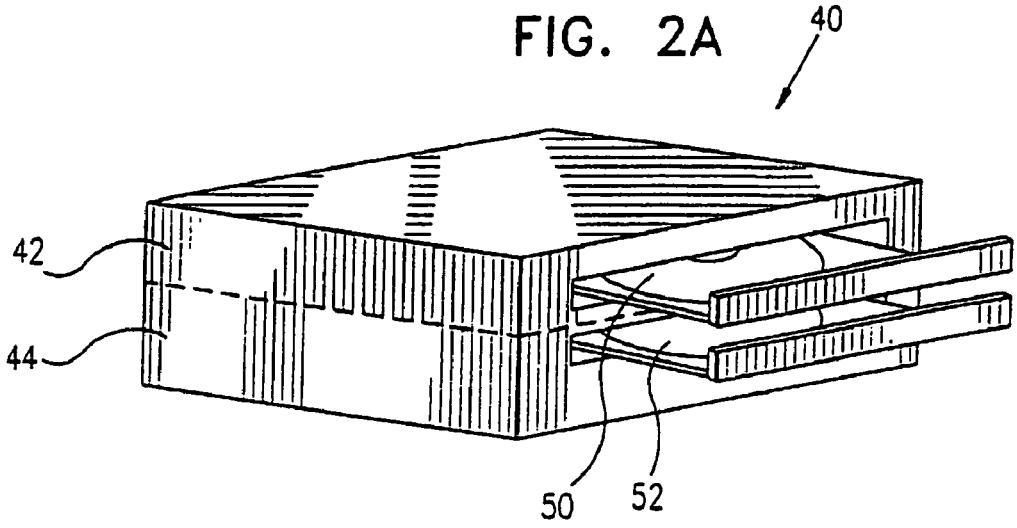
FIG. 2A is a simplified pictorial illustration of a CD recording system with dual CD drives, in accordance with another preferred embodiment of the present invention.
Figure 2B:
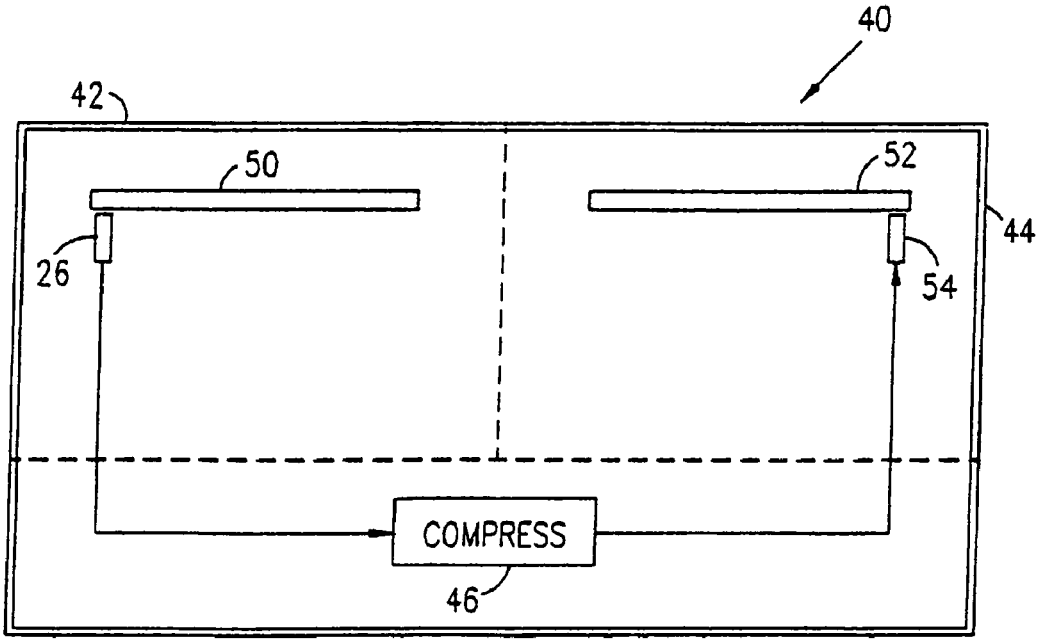
FIG. 2B is a schematic block diagram illustrating the operation of the system of FIG. 2A.

FIGS. 2A and 2B schematically illustrate a CD recording system 40, useful particularly for producing long-playing disks to be played in player 20, in accordance with a preferred embodiment of the present invention. FIG. 2A is simplified pictorial illustration of system 40, and FIG. 2B is a schematic block diagram illustrating the operation of the system shown in FIG. 2A.

Recording system 40 comprises a CD read drive 42 and a CD write drive 44. A conventional CD 50, containing uncompressed audio data, is inserted into drive 42, and a blank, recordable CD 52 is inserted into drive 44. Digital audio data from CD 50 is read by optical read head 26, which transfers the data to compression circuitry 46. Circuitry 46 compresses the digital data, preferably using MPEG Layer-3 encoding, as is known in the art. Circuitry 46 may comprise a custom VLSI or ASIC chip or, alternatively or additionally, a general-purpose processor with suitable software, as well as requisite memory components and/or peripheral devices. Compressed data is transferred from circuitry 46 to a write head 54 in drive 44, which records the data onto CD 52.

Preferably, a user of system 40 chooses one or more tracks of CD 50 to be read, compressed and written onto CD 52 in any desired order. Thereafter, CD 50 is removed and replaced with another CD, from which audio data is read. This operation may be repeated numerous times, thus allowing recording of approximately 888 minutes (14.8 hours) of high-quality stereo audio sound onto one recordable, long-playing CD 52, based on the 12-fold compression that can be achieved using MPEG Layer-3. CD 52 can then be played in a portable CD player, such as player 20 shown in FIGS. 1A and 1B, thereby replacing numerous cumbersome conventional (74 minute) short-playing CDs with one 888 minute long-playing CD, and enabling the user the freedom of extended listening with one CD.

In an alternative preferred embodiment, circuitry 46 also includes decoder chip 28, or other decompression circuitry, and thus performs both the function of compression to MPEG standard encoding and decompression from MPEG standard encoding, thus enabling recording system 40 to function also as a playback device for long-play 888 minute CDs, similar to long-play CD player 20.

In still another alternative embodiment, not shown in the figures, system 40 may comprise only a single read/write CD drive, along with a fixed mass-memory device, such as a magnetic hard disk. In this case, conventional CDs 50 are first inserted one by one into the drive. The audio data are read from the CDs, compressed by circuitry 46, then temporarily stored in the mass-memory device. Then recordable CD 52 is inserted into the same read/write CD drive, and the stored, compressed data from the mass-memory device are recorded on the recordable CD.

It will be appreciated that the preferred embodiments described above are cited by way of example, and the full scope of the invention is limited only by the claims.

SOFTWARE APPENDIX

The computer software listing attached hereto comprises source code files for AMP (Audio MPEG Player), written in the C programming language. This code, which is available for download via the Internet at ftp://ftp.rasip.fer.hr/pub/mpeg, may be compiled using any suitable C-language compiler and run on any of a variety of operating platforms, for example, under the Microsoft Windows 95 operating system on a personal computer that is equipped with an Intel Pentium MMX processor. The code is covered by copyright and may be used commercially only subject to the agreement of the copyright holder.

What is claimed is:

[1. A CD player, comprising:

a CD drive, which receives a CD and reads MPEG Layer-3 compressed digital audio data recorded thereon; and an integrated circuit chip, which decompresses the MPEG Layer-3 compressed data in real time and produces a non-compressed audio output.]

[2. A CD player according to claim 1, wherein the data are compressed at least 4-fold.]

[3. A CD player according to claim 2, wherein the data are compressed at least 8-fold.]

[4. A CD player according to claim 3, wherein the data are compressed approximately 12-fold.]

[5. A CD player according to claim 1, wherein the chip includes firmware for decompressing the data.]

[6. A CD player according to claim 1, wherein the chip comprises a custom integrated circuit chip.]

[7. A CD player according to claim 1, wherein the chip does not comprise a general purpose processor.]

[8. A CD player according to claim 1, wherein the CD player comprises a mobile personal audio player.]

[9. A CD player according to claim 8, wherein the CD player is installed in a vehicle.]

10. A CD recording system, comprising:

a read drive, which receives and reads a first CD having audio data recorded thereon;

compression circuitry, which receives and compresses the audio data from the read drive by MPEG Layer-3 compression in real time; and a write drive, which receives the audio data compressed by MPEG Layer-3 compression and records the audio data compressed by MPEG Layer-3 compression on a second, recordable CD.

11. A CD system according to claim 10, wherein the circuitry includes firmware for compressing the data.

12. A CD system according to claim 10, wherein the circuitry compresses the data at least 4-fold.

13. A CD system according to claim 12, wherein the circuitry compresses the data at least 8-fold.

14. A CD system according to claim 13, wherein the circuitry compresses the data approximately 12-fold.

[15. A method for playing a long-playing audio CD, comprising:

reading MPEG Layer-3 compressed digital audio data from the CD; and decompressing the MPEG Layer-3 compressed data in real time using a integrated circuit chip; and converting resulting decompressed data to analog form.]

[16. A method according to claim 15, wherein decompressing the data comprises decompressing by MPEG decoding.]

[17. A method according to claim 16 wherein decompressing the data comprises decompressing by MPEG Layer-3 decoding.]

[18. A method according to claim 15, wherein decompressing the data comprises decompressing by at least 4-fold.]

[19. A method according to claim 18, wherein decompressing the data comprises decompressing by at least 8-fold.]

[20. A method according to claim 19, wherein decompressing the data comprises decompressing by approximately 12-fold.]

[21. A method according to claim 15, wherein reading the compressed data comprises playing the CD in a mobile personal audio player.]

[22. A method according to claim 15, wherein reading the compressed data comprises playing the CD in a CD player installed in a vehicle.]

[23. A method for producing a long-playing audio CD, comprising:

reading MPEG Layer-3 compressed digital audio data from a prerecorded CD;

compressing the data using MPEG Layer-3 compression in real time; and recording resulting MPEG Layer-3 compressed data on the long-playing CD.]

[24. A method according to claim 23, wherein compressing the data comprises compressing by at least 4-fold.]

[25. A method according to claim 24, wherein compressing the data comprises compressing by at least 8-fold.]

[26. A method according to claim 25, wherein compressing the data comprises compressing by approximately 12-fold.]

[27. A method according to claim 23, wherein reading the data comprises reading data from a plurality of prerecorded CDs.]

[28. A method according to claim 27, wherein reading the data comprises inserting each of the plurality of CDs in sequence into a read drive, in order to read data therefrom.]

[29. A method according to claim 23, wherein recording the data comprises recording data on the long-playing CD in an order that is different from the order of the data on the prerecorded CD.]

*30. The CD recording system of claim 10, wherein the decompression circuitry comprises a decoder chip.*

*31. The CD recording system of claim 30, wherein the decoder chip is a MPEG decoder chip.*

*32. The CD recording system of claim 10, wherein the compression circuitry includes a custom VLSI chip.*

*33. The CD recording system of claim 10, wherein the compression circuitry includes a custom ASIC chip.*

*34. A CD recording system, comprising:*

*only a single read and write CD drive, which receives and reads a CD having audio data recorded thereon;*

*compression circuitry, which receives and compresses the audio data from the read and write CD drive by MPEG Layer-3 compression in real time; and*

*a mass-memory device, which stores the audio data compressed by the compression circuitry and sends the audio data compressed by MPEG Layer-3 compression to the read and write CD drive to be written into a recordable CD.*

*35. The CD recording system of claim 34, wherein the compression circuitry includes a custom VLSI chip.*

*36. The CD recording system of claim 34, wherein the compression circuitry includes a custom ASIC chip.*

*37. The system of claim 34, wherein the CD drive reads a CD having uncompressed audio data recorded thereon.*

* * * * *

UNITED STATES PATENT AND TRADEMARK OFFICE

CERTIFICATE OF CORRECTION

PATENT NO. : RE44,044 E
APPLICATION NO. : 10/996329
DATED : March 5, 2013
INVENTOR(S) : Joel Vidal et al.

It is certified that error appears in the above-identified patent and that said Letters Patent is hereby corrected as shown below:

In the Claims

Column 7:

Line 17, Claim 10, rewrite to read as follows, --uncompressed audio data in tracks recorded in a first order thereon;--;

Line 18, Claim 10, change "and compresses the" to --the uncompressed audio data--;

Line 19, Claim 10, after "audio data" insert --directly from the read drive and compresses the uncompressed audio data received directly from the read drive--;

Line 20, Claim 10, after "time;" insert the following:
--decompression circuitry, which decompresses the audio data from MPEG standard encoding--;

Line 24, Claim 10, after "CD" insert --with the tracks in a second order different from the first order of the audio data on the first CD--;

Line 25, Claim 11, after "the" insert --compression--;

Line 26, Claim 11, after "the" insert --decompressed audio--;

Line 27, Claim 12, after "the" insert --compression--;

Line 28, Claim 12, after "the" insert --decompressed audio--;

Line 29, Claim 13, after "the" insert --compression--;

Line 30, Claim 13, after "the" insert --decompressed audio--;

Line 31, Claim 14, after "the" insert --compression--; and

Line 32, Claim 14, after "the" insert --decompressed audio--.

Column 8:

Line 45, Claim 34, change "into" to --onto--.

Signed and Sealed this
Second Day of July, 2013

Teresa Stanek Rea
*Acting Director of the United States Patent and Trademark Office*